United States Patent
Phillips et al.

(10) Patent No.: US 6,583,599 B1
(45) Date of Patent: Jun. 24, 2003

(54) METHOD AND APPARATUS FOR CONTROLLING BATTERY CHARGING IN A HYBRID ELECTRIC VEHICLE

(75) Inventors: Anthony Mark Phillips, Northville, MI (US); John Richard Blankenship, Dearborn, MI (US); Kathleen Ellen Bailey, Dearborn, MI (US); Miroslava Jankovic, Birmingham, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 119 days.

(21) Appl. No.: 09/705,501

(22) Filed: Nov. 3, 2000

(51) Int. Cl.[7] .................................................. H02J 7/00
(52) U.S. Cl. ...................................... 320/104; 320/103
(58) Field of Search ................................ 320/104, 103; 180/65.1, 65.2, 65.3, 65.4, 65.5–65.8

(56) References Cited

U.S. PATENT DOCUMENTS 6,158,541 A * 12/2000 Tabata et al. ............... 180/165
6,196,344 B1 * 3/2001 Tamor ........................ 180/65.4

* cited by examiner

Primary Examiner—Peter S. Wong
Assistant Examiner—Lawrence Luk
(74) Attorney, Agent, or Firm—Mark S. Sparschu

(57) ABSTRACT

A starter/alternator system (24) for hybrid electric vehicle (10) having an internal combustion engine (12) and an energy storage device (34) has a controller (30) coupled to the starter/alternator (26). The controller (30) has a state of charge manager (40) that monitors the state of charge of the energy storage device. The controller has eight battery state-of-charge threshold values that determine the hybrid operating mode of the hybrid electric vehicle. The value of the battery state-of-charge relative to the threshold values is a factor in the determination of the hybrid mode, for example; regenerative braking, charging, battery bleed, boost. The starter/alternator may be operated as a generator or a motor, depending upon the mode.

13 Claims, 1 Drawing Sheet

METHOD AND APPARATUS FOR CONTROLLING BATTERY CHARGING IN A HYBRID ELECTRIC VEHICLE

GOVERNMENTAL RIGHTS

This invention was made with government support under Prime Contract No. DE-AC36-83CH10093, Subcontract No. ZCB-4-13032-02, awarded by the Department of Energy. The Government has certain rights in this invention.

TECHNICAL FIELD

The present invention relates generally to control systems and methods for controlling hybrid electric vehicles, more specifically, the present invention relates generally to battery charge management for hybrid electric vehicles.

BACKGROUND OF THE INVENTION

Automotive vehicles with internal combustion engines are typically provided with both a starter motor and alternator. In recent years, a combined alternator and starter motor has been proposed particularly for use in hybrid electric vehicles. During initial startup of the vehicle, the starter/alternator functions as a starter. While functioning as a starter, the starter/alternator rotates the crankshaft of the engine while the cylinders are fired.

After the engine is started, the starter/alternator is used as a generator to charge the electrical system of the vehicle.

In automotive applications, the engine may be shut down during stops (e.g., red lights). When the accelerator is depressed, the starter/alternator starts the motor and the engine will resume firing. Thus, many startups may occur over the course of a trip.

The starter/alternator can also be operated as a motor if the state-of-charge management strategy deems it desirable to reduce the state-of-charge of the battery (i.e., "bleed model") to allow for the collection of regenerative energy via braking.

Another mode of the starter/alternator is providing additional torque (i.e., "boost") to the wheels when the torque of the engine is not enough to meet the driver demand.

During braking hybrid electric vehicles seek to recharge the batteries by recapturing the kinetic energy of the vehicle. Batteries for the hybrid electric vehicles by their nature have a limited operating life. If, during operation, an adequate charge is not maintained the battery life may be shortened.

It would therefore be desirable to control the state of charge of the battery to prolong battery life while achieving the required hybrid functionality.

SUMMARY OF THE INVENTION

It is therefore one object of the invention to create calibrateable state-of-charge boundary parameters for this state-of-charge management algorithm for the primary purpose of operating the hybrid electric vehicle in the desired hybrid operating mode, which will have the secondary effect of increasing the battery life of a hybrid electric vehicle.

In one aspect of the invention, a method of charging a battery in a hybrid electric vehicle having a starter/alternator and a battery having a state of charge comprises the step of:

When the state of charge is below a first predetermined value, allowing the charging of the battery through operation of the starter/alternator as a generator; and similarly when the state of charge is below a another predetermined value, allowing the battery to be charged via regenerative braking; and when the state-of-charge is below another predetermined value, keeping the engine on because the battery charge may be too low to restart the engine if it is stopped.

When the state of charge is above another predetermined value, allowing the battery to bleed by, operating the starter/alternator as a motor and when the state-of-charge is above another predetermined value allowing the vehicle to "boost" the torque at the wheels to meet driver demand that could not be met by the engine alone, by operating the starter/alternator as a motor, consequently reducing the state-of-charge.

In a further aspect of the invention, a system for an automotive vehicle having an internal combustion engine, an energy storage device and a starter/alternator coupled to the engine includes a controller coupled to the starter/alternator and to the energy storage device. The controller monitors a state of charge of the energy storage device. When the state of charge is below predetermined values for the various hybrid modes of charging, regenerative braking or for keeping the engine on if the SOC is very low, the controller allows charging of the battery through operation of the starter/alternator as a generator. When the state of charge is above predetermined values, the controller allows the battery to reduce the state-of-charge for both the "bleed" and "boost" hybrid modes by operating the starter/alternator as a motor.

One advantage of the invention is the state of charge manager may be set with some hysteresis to avoid rapid changing between the different modes.

Other objects and features of the present invention will become apparent when viewed in light of the detailed description of the preferred embodiment when taken in conjunction with the attached drawings and appended claims.

DESCRIPTION OF THE PREFERRED EMBODIMENT

The present invention is described with respect to a particular state of charge diagram and a particular hybrid vehicle configuration. However, the teachings of the present invention may be applied to various alternative state-of-charge diagrams and hybrid vehicle configurations would be evident to those in the art.

Figure 1:
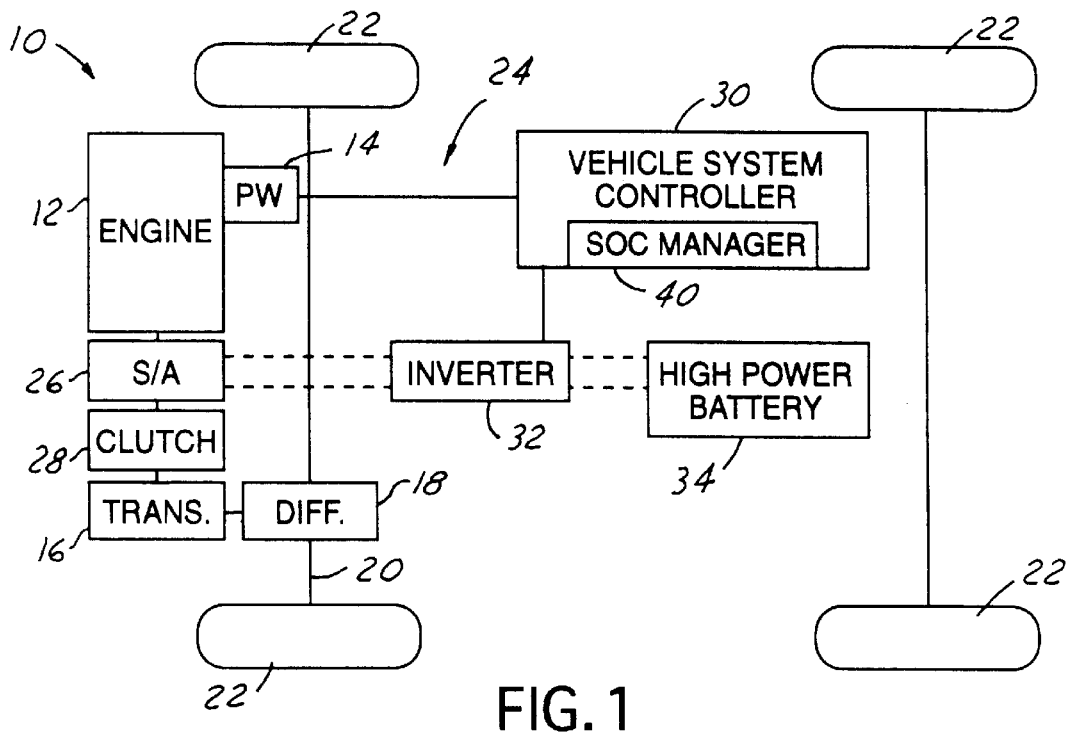
FIG. 1 is a schematic view of an automotive vehicle having a starter/alternator system according to the present invention.

Referring now to FIG. 1, an automotive vehicle 10 is illustrated having an internal combustion engine 12 having cylinders with pistons (not shown) located therein. Each cylinder is coupled to a spark plug and fuel pump through a fuel injector (not shown) or other fuel delivery system as is common in the art. Each cylinder also has a spark plug or other ignition source coupled to a powertrain control unit 14. A powertrain control unit 14 controls the ignition timing and fuel pump operation in a conventional manner subject to the improvements of the present invention.

Engine 12 is coupled to a transmission 16. Transmission 16 may be automatic, manual or continuously variable. Transmission 16 is coupled to a differential 18 to drive an axle 20 which in turn provides power to wheels 22. Of course, the present invention is also applicable to four wheel drive systems in which all of the wheels 22 are driven.

A starter/alternator system 24 that includes a starter/alternator 26 and its associated control electronics is coupled to engine 12. In one embodiment of the present invention, starter/alternator 26 is positioned between a housing of transmission 16 and the engine 12. A clutch 28 is used to engage and disengage engine 12 from transmission 16. As will be further described below, starter/alternator 26 is used as a starter during engine startup and as an alternator to supply power to recharge the batteries of the vehicle and to supply electrical loads. Clutch 28 also allows starter/alternator 26 to start the engine prior to engagement of the transmission.

Starter/alternator system 24 has a vehicle system controller 30 that is coupled to powertrain control unit 14 and to a power inverter 32. In practice, the power inverter 32 and system controller 30 may be contained in a single package. The inverter 32 is used to convert DC power to AC power in the startup mode and AC power to DC power in power generation mode as will be further described below.

Power inverter 32 is coupled to an energy storage device 34 such as a high power battery or an ultra capacitor. Of course, those skilled in the art would recognize that DC to DC converter (not shown) may be interposed between energy storage device 34 and inverter 32. Also, the energy storage device 34 may be, for example, comprised of many batteries including a 12 volt battery to provide power to the vehicle electronics. Of course, the actual battery voltage is dependent on the particular system to which it is attached.

Vehicle system controller 30 has a state of charge (SOC) manager 40 that monitors the state of charge of energy storage device 34. The goal of the SOC manager is to prevent the state of charge of energy storage device 34 from overcharging or operating in an undesirably low state that may prevent the vehicle from restarting. Various thresholds may be set for the different modes of operation as will be described below. These thresholds may overlap to provide some hysterisis to prevent rapid movement back and forth between two different states. Also, because some of the thresholds overlap, priority may be set between them to establish desirable operation.

Figure 2:
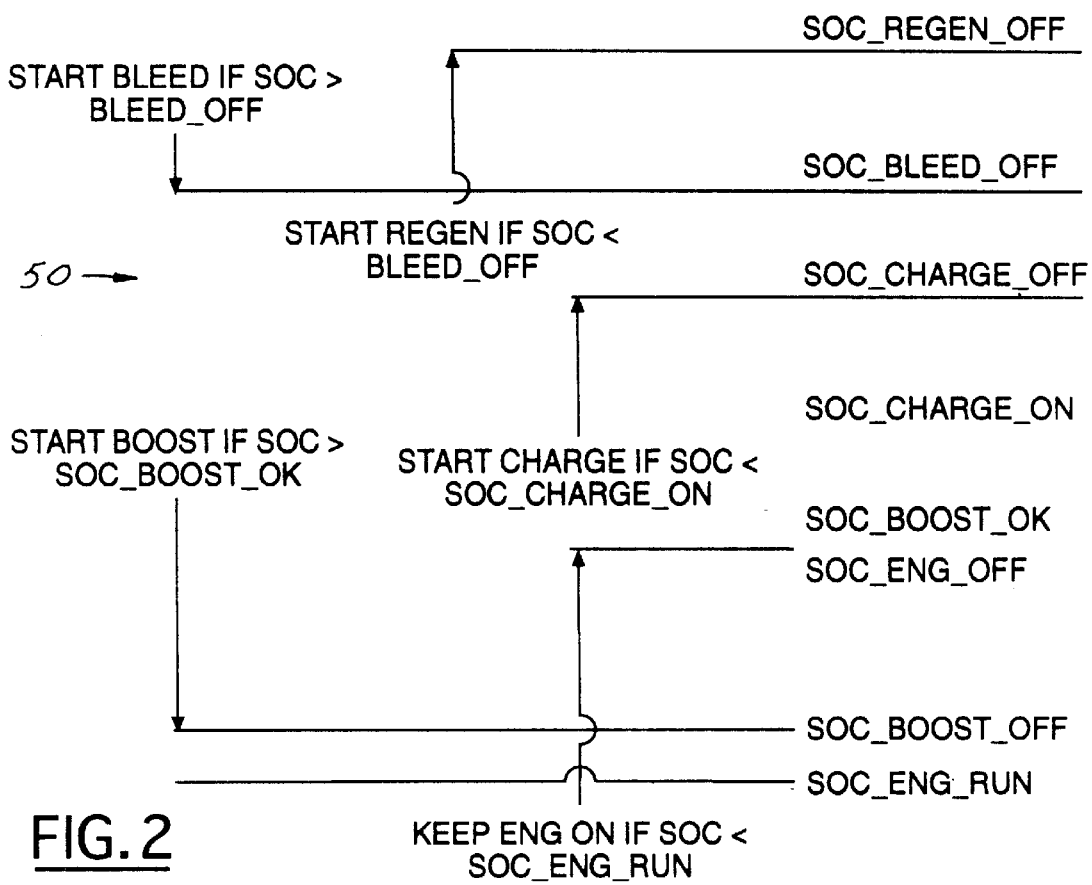
FIG. 2 is a state diagram of a state of charge management according to the present invention.

Referring now to FIG. 2, a state diagram of state of manager 40 is illustrated to illustrate its desired operation. Various state of charge thresholds are established. The first threshold is an engine running threshold (SOC_ENG_RUN) below which the state of charge manager keeps the engine running because the power left in the energy management device is less than that required to restart the engine. Another threshold greater than the engine running threshold is the boost off threshold (SOC_BOOST_OFF). When the energy storage device has a state of charge that is below the boost off threshold, the state of charge manager does not allow the starter/alternator 26 to act as a motor and boost the power output of the hybrid electric powertrain. The boost off threshold is set because if boost were provided from the energy storage device, the energy storage device would likely not have enough power after boosting to allow the engine to restart.

Another threshold greater than the boost off threshold is the engine off threshold (SOC_ENG_OFF). Above the engine off threshold the state of charge is such that it is safe to shut the engine off. Between SOC_ENG_OFF and SOC_ENG_RUN, the engine should be restarted if it is off to prevent SOC from crossing below SOC_ENG_RUN.

Another threshold that may be simultaneous with the engine off threshold or above the engine off threshold is the boost ok threshold (SOC_BOOST_OK). Above the boost ok threshold the starter/alternator is allowed to operate as a motor to provide additional torque to maximize the engine torque to meet driver demand in a high power situation.

Another threshold established is the charge on threshold (SOC_CHARGE_ON). The charge on threshold allows the battery to be charged by the starter/alternator acting as a generator. The charge on threshold is preferably above the boost ok threshold.

Another threshold is the charge off threshold (SOC_CHARGE_OFF). The charge off threshold is set so that above the charge of f threshold the starter/alternator is not allowed to be in charge mode. Above this threshold the hybrid electric vehicle is able to recapture kinetic energy through regenerative braking. The charge off threshold and the charge on threshold may be simultaneous. However, in a preferred embodiment, the charge on threshold is located between the charge off threshold and the boost ok threshold.

A bleed off threshold (SOC_BLEED_OFF) is established above the charge off threshold. When battery state-of-charge is above the bleed off threshold, the bleeding of the battery by operating the starter/alternator as a motor is permitted. This reduces battery state-of-charge to allow room in the battery to be able to accept recaptured kinetic energy through regenerative braking.

The final threshold is. the regenerative braking off threshold (SOC_REGEN_OFF). The regenerative braking off threshold prevents the battery from becoming overcharged. Thus, if the state of charge reaches the regenerative braking off threshold, no regenerative braking is allowed. Also recall that the charge off threshold is also set below the regenerative braking threshold so that the battery will not be charged or try to be charged over the regenerative braking threshold. Thus, below the regenerative braking threshold, regenerative braking may take place.

As those skilled in the art will recognize, the operation of the vehicle changes under various driving conditions. Thus, it is desirable to take advantage of regenerative braking whenever possible. Thus, anytime below the regenerative braking threshold the energy storage device may be regeneratively braked. Also, anywhere below the charge on threshold, the starter/alternator is acting as a generator to allow the battery to be charged by the starter/alternator.

Thus, to summarize the operating limit constraints:

SOC_ENG_RUN<SOC_BOOST_OFF<SOC_ENG_OFF

SOC_ENG_OFF<=SOC_BOOST_OK<SOC_CHARGE_ON

SOC_CHARGE_ON<SOC_CHARGE_OFF<SOC_BLEED_OFF

SOC_BLEED_OFF<SOC_REGEN_OFF

While particular embodiments of the invention have been shown and described, numerous variations and alternate embodiments will occur to those skilled in the art. Accordingly, it is intended that the invention be limited only in terms of the appended claims.

What is claimed is:

1. A system for an automotive vehicle comprising:
   an internal combustion engine;
   an energy storage device;
   a starter/alternator coupled to the engine;
   a controller coupled to the starter/alternator and to the energy storage device, said controller monitors a state of charge of the energy storage device, a plurality of threshold levels are established for controlling charging of the energy storage device, said controller compares the state of charge to the threshold levels to determine the operation of the starter/alternator, wherein a first threshold of said plurality of threshold levels comprises an engine run threshold, a second threshold of said plurality of threshold levels comprises a boost off threshold, a third threshold of said plurality of threshold levels comprises an engine off threshold, a fourth threshold of said plurality of threshold levels comprises a boost_ok threshold, a fifth threshold of said plurality of threshold levels comprises a charge on threshold, a sixth threshold of said plurality of threshold levels comprises a charge_off threshold, and a seventh threshold of said plurality of threshold levels comprises a bleed off threshold.

2. A system as recited in claim 1 wherein a first threshold of said plurality of threshold levels comprises an engine run threshold, a second threshold of said plurality of threshold levels comprises a boost off threshold and a third threshold of said plurality of threshold levels comprises an engine off threshold, wherein said first threshold is less than said second threshold, said second threshold less than said third threshold.

3. A system for an automotive vehicle comprising:
an internal combustion engine;
an energy storage device;
a starter/alternator coupled to the engine;
a controller coupled to the starter/alternator and to the energy storage device, said controller monitors a state of charge of the energy storage device, a plurality of threshold levels are established for controlling charging of the energy storage device, said controller compares the state of charge to the threshold levels to determine the operation of the starter/alternator, wherein a first threshold of said plurality of threshold levels comprises an engine run threshold, a second threshold of said plurality of threshold levels comprises a boost off threshold and a third threshold of said plurality of threshold levels comprises an engine off threshold, wherein said first threshold is less than said second threshold, said second threshold less than said third threshold.

4. A system for an automotive vehicle comprising:
an internal combustion engine;
an energy storage device;
a starter/alternator coupled to the engine;
a controller coupled to the starter/alternator and to the energy storage device, said controller monitors a state of charge of the energy storage device, a plurality of threshold levels are established for controlling charging of the energy storage device, said controller compares the state of charge to the threshold levels to determine the operation of the starter/alternator, wherein a fifth threshold of said plurality of threshold levels comprises a charge on threshold, a sixth threshold of said plurality of threshold levels comprises a charge_off threshold and, a seventh threshold of said plurality of threshold levels comprises a bleed off threshold, wherein said fifth threshold is less than said sixth, said sixth threshold less than said seventh threshold.

5. A system for an automotive vehicle comprising:
an internal combustion engine;
an energy storage device;
a starter/alternator coupled to the engine;
a controller coupled to the starter/alternator and to the energy storage device, said controller monitors a state of charge of the energy storage device, a plurality of threshold levels are established for controlling charging of the energy storage device, said controller compares the state of charge to the threshold levels to determine the operation of the starter/alternator, wherein a seventh threshold of said plurality of threshold levels comprises a bleed off threshold and an eighth threshold of said plurality of threshold levels comprises a regenerative braking off threshold, wherein said seventh threshold is less than said eighth threshold.

6. A method of charging a battery in a hybrid electric vehicle having a starter/alternator and a battery having a state of charge comprising the steps of:
when the state of charge is below a first predetermined value, allowing the charging of the battery through operation of the starter/alternator as a generator;
when the state of charge is above a second predetermined value, allowing the battery to bleed; and when the state of charge is above first predetermined value disabling the charging of the battery through operation of the starter/alternator as a generator.

7. A method as recited in claim 6 further comprising the step of when the state of charge is below a second predetermined value, disabling bleeding of the battery.

8. A method as recited in claim 5 wherein the first predetermined value is less than the second predetermined value.

9. A method of charging a battery in a hybrid electric vehicle having a starter/alternator and a battery having a state of charge comprising the steps of:
when the state of charge is below a first predetermined value, allowing the charging of the battery through operation of the starter/alternator as a generator; and
when the state of charge is above a second predetermined value, allowing the battery to bleed; wherein the steps of allowing the charging of the battery and allowing the charging of the battery are mutually exclusive.

10. A method of charging a battery in a hybrid electric vehicle having a starter/alternator and a battery having a state of charge comprising the steps of:
when the state of charge is below a first predetermined value, allowing the charging of the battery through operation of the starter/alternator as a generator;
when the state of charge is above a second predetermined value, allowing the battery to bleed; and when the state of charge is below a third predetermined value lower than the first predetermined value, running the engine until the battery charges above the third predetermined value.

11. A method of charging a battery in a hybrid electric vehicle having a starter/alternator and a battery having a state of charge comprising the steps of:
when the state of charge is below a first predetermined value, allowing the charging of the battery through operation of the starter/alternator as a generator;
when the state of charge is above a second predetermined value, allowing the battery to bleed; and when the charge is below a fourth predetermined value above the third predetermined value, disabling boost from the battery.

12. A method of charging a battery in a hybrid electric vehicle having a starter/alternator and a battery having a state of charge comprising the steps of:
when the state of charge is below a first predetermined value, allowing the charging of the battery through operation of the starter/alternator as a generator;

when the state of charge is above a second predetermined value, allowing the battery to bleed; and when the charge is above a fifth predetermined value above the fourth predetermined value, allowing the starter/alternator to operate as a motor.

13. A method of charging a battery of a hybrid electric vehicle comprising the steps of:

when a state of charge of the battery is below a first predetermined value, running the engine until the battery charges above the first predetermined value;

when the state of charge is below a second predetermined value above the first predetermined value, disabling boost from the battery;

when the state of charge is above a third predetermined value above the second predetermined value, allowing the starter/alternator to operate as a motor;

when the state of charge is above a fourth predetermined value above the third predetermined value, disabling the starter/alternator to operate as a generator;

when the state of charge is above a fifth predetermined value above the fourth predetermined value, bleeding the battery; and when the state of charge is above a fifth predetermined value above the fourth predetermined value, disabling regeneration of the battery.

* * * * *